United States Patent
Maalouf et al.

(10) Patent No.: US 11,004,042 B2
(45) Date of Patent: May 11, 2021

(54) DEVICE FOR MECHANIZED AUTOMATION OF DIAGNOSTICS AND UPGRADES FOR PORTABLE MULTIFUNCTION DEVICES

(71) Applicants: Ramzi Khalil Maalouf, Chevy Chase, MD (US); Jinrong Yang, Shanghai (CN)

(72) Inventors: Ramzi Khalil Maalouf, Chevy Chase, MD (US); Jinrong Yang, Shanghai (CN)

( * ) Notice: Subject to any disclaimer, the term of this patent is extended or adjusted under 35 U.S.C. 154(b) by 91 days.

(21) Appl. No.: 15/149,651

(22) Filed: May 9, 2016

(65) Prior Publication Data

US 2017/0024707 A1   Jan. 26, 2017

Related U.S. Application Data

(60) Provisional application No. 62/159,308, filed on May 10, 2015.

(51) Int. Cl.
   *G06Q 10/00*      (2012.01)
   *H04M 1/24*       (2006.01)
   *G07F 17/00*      (2006.01)
   *H04M 1/72406*    (2021.01)

(52) U.S. Cl.
   CPC ......... *G06Q 10/20* (2013.01); *G07F 17/0014* (2013.01); *H04M 1/24* (2013.01); *H04M 1/72406* (2021.01)

(58) Field of Classification Search
   CPC .................................................. G06Q 10/00
   See application file for complete search history.

(56) References Cited

U.S. PATENT DOCUMENTS

| | | | |
|---|---|---|---|
| 9,070,101 B2 * | 6/2015 | Abhyanker | G06Q 10/087 |
| 9,373,149 B2 * | 6/2016 | Abhyanker | G05D 1/0251 |
| 9,452,884 B2 * | 9/2016 | Rutledge | G07C 9/00134 |
| 10,050,959 B2 * | 8/2018 | Soon-Shiong | H04L 9/0872 |
| 10,127,647 B2 * | 11/2018 | Forutanpour | G01N 21/88 |
| 10,438,174 B2 * | 10/2019 | Bowles | G06Q 10/30 |
| 2009/0321511 A1 * | 12/2009 | Browne | B03B 9/061 |
| | | | 235/375 |

(Continued)

OTHER PUBLICATIONS

New Feature—Customizable Embed Widget for device repairs (Year: 2014).*

*Primary Examiner* — Bruce I Ebersman
(74) *Attorney, Agent, or Firm* — Stephen A. Mason

(57) ABSTRACT

A portable device repair machine may be configured to receive portable devices, identify the portable device, diagnose, repair and/or upgrade the portable device, collect payment for the service and return the portable device to the payee. The portable device repair machine may include an audio/video interface for interaction with a portable device user as well as a mechanized connection, inspection, diagnostic and upgrade system. The mechanized connection, inspection, diagnostic and upgrade system may comprise a conveyance mechanism for conveying the portable device among multiple stations such as a physical inspection station, device connection mechanism station, diagnostic, repair and upgrade station, and a physical upgrade station. Various mechanical devices, such as robotic arms may interact with the portable device, based in part on feedback obtained via various image sensors within the portable device repair machine.

18 Claims, 12 Drawing Sheets

(56) References Cited

U.S. PATENT DOCUMENTS

| | | | | |
|---|---|---|---|---|
| 2014/0180914 A1* | 6/2014 | Abhyanker | ............... | G01C 1/00 |
| | | | | 705/39 |
| 2015/0145642 A1* | 5/2015 | Rutledge | ............ | G07C 9/00134 |
| | | | | 340/5.51 |
| 2016/0098689 A1* | 4/2016 | Bowles | .................. | G06Q 20/18 |
| | | | | 705/23 |

* cited by examiner

US 11,004,042 B2

DEVICE FOR MECHANIZED AUTOMATION OF DIAGNOSTICS AND UPGRADES FOR PORTABLE MULTIFUNCTION DEVICES

PRIORITY

This application claims benefit of priority of U.S. Provisional Application Ser. No. 62/159,308, filed 10 May 2015, the contents of which are incorporated by reference herein in their entirety.

BACKGROUND

Non-mobile phones have been disposable items that do not warrant repair. That is, for some time now, if a non-mobile phone stopped working, it was less expensive and much more expedient to purchase another non-mobile phone than to have the non-mobile phone repaired.

Somewhat similarly, the most basic mobile phones have also become relatively disposable. On the other hand, smart phones and other higher-end portable multifunction devices remain relatively expensive to replace wholesale. However, custom, manual repair work for such devices can also be expensive as well as time consuming and inconvenient. What is needed is a convenient, less expensive, automated service for today's portable multifunction devices.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of systems and methods associated with a device for mechanized automation of diagnostics and upgrades for portable multifunction devices are described.

In embodiments, an Automated Mobile Phone Machine (AM-PM) system and associated methods are described. In some embodiments, the AM-PM system is a compact, multi-use, intelligent, self-contained, unmanned unit providing automated sales, diagnostic reports, and certified after sale services and repairs for smart mobile phones. For example, a user inserts any smart phone or other portable multifunction device into the AM-PM. In embodiments, the disclosed technology will recognize the brand and model number and run a diagnostic hardware and software component scan. Users may be prompted to confirm the model number and to enter the options such as a. Scan and Diagnostic (S&D) report only (e.g., free), or b. S&D report+ repair estimate (fee-based); or c. Sell your Phone estimate (e.g., free).

In embodiments, AM-PM may produce a report with an estimate for the selected service. Additionally, the AM-PM may provide an option to simply opt to d. Buy a Refurbished Phone. For example, the AM-PM may display the offer and accept payment upon acceptance of the offer. AM-PM units may be conveniently located in secure and accessible locations (such as next to ATMs at Banks or within major retail outlets) and may be accessible anytime (thus AM-PM). This one-stop-shop for mobile phones may provide secure and convenient transactions with a guaranteed turnaround, as well as a very competitive cost advantage to users due to low overheads and factory direct repairs, in embodiments.

Figure 1:
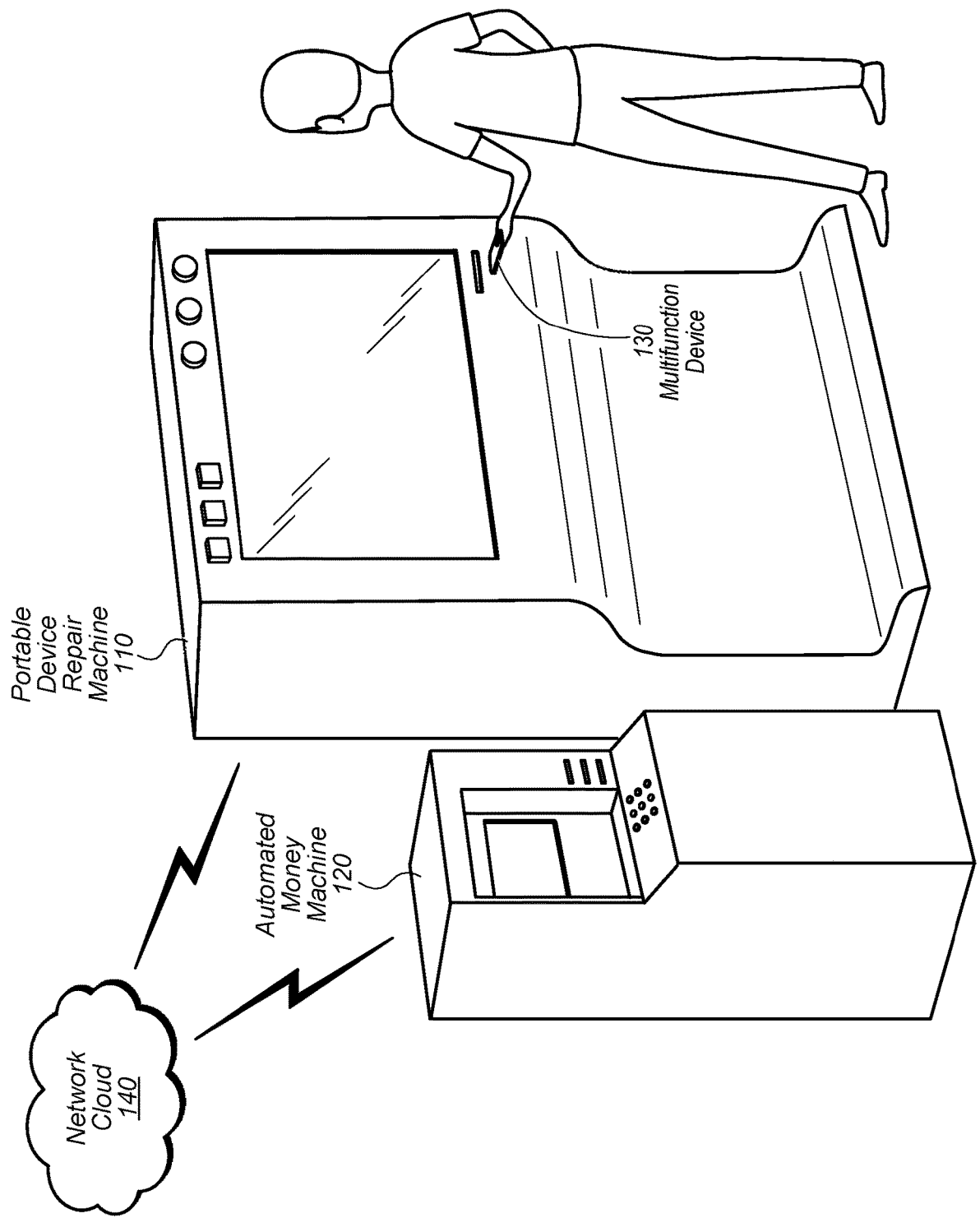
FIG. 1 illustrates a device for mechanized automation of diagnostics and upgrades for portable multifunction devices, according to some embodiments.

FIG. 1 illustrates a device for mechanized automation of diagnostics and upgrades for portable multifunction devices, according to some embodiments. Such a device may sometimes be referred to herein as a portable multifunction device repair machine. FIGS. 2-4 and 10-11 illustrate that a portable multifunction device repair machine may include various components, modules, interfaces, systems, units and the like. Various processes that may be associated or performed by a portable multifunction device repair machine are illustrated in FIGS. 5-9.

In FIG. 1, an owner or operator or possessor or user of the multifunction device 130 is illustrated depositing (or removing) multifunction device 130 into (from) portable device repair machine 110. Portable device repair machine 110 is illustrated next to automated money machine 120 and the two machines are illustrated as connectively coupled via network cloud 140. Network cloud may include any number of various types of interconnected networks, in embodiments. For example, automated money machine 120 may be connectively coupled to portable device repair machine 110 via a local network (e.g., a Bluetooth network or a LAN) or via a WAN, for example. In the illustrated embodiment, the repair machine 110 is illustrated with inventory 112 and vending door 132 for providing user-access to items released from inventory 112. Inventory may include an item that is saleable. A non-exhaustive list of example inventory includes new, repaired or consignment portable devices, batteries, SIM cards, memory cards, phone cases, charging cords, etc.

Figure 2:
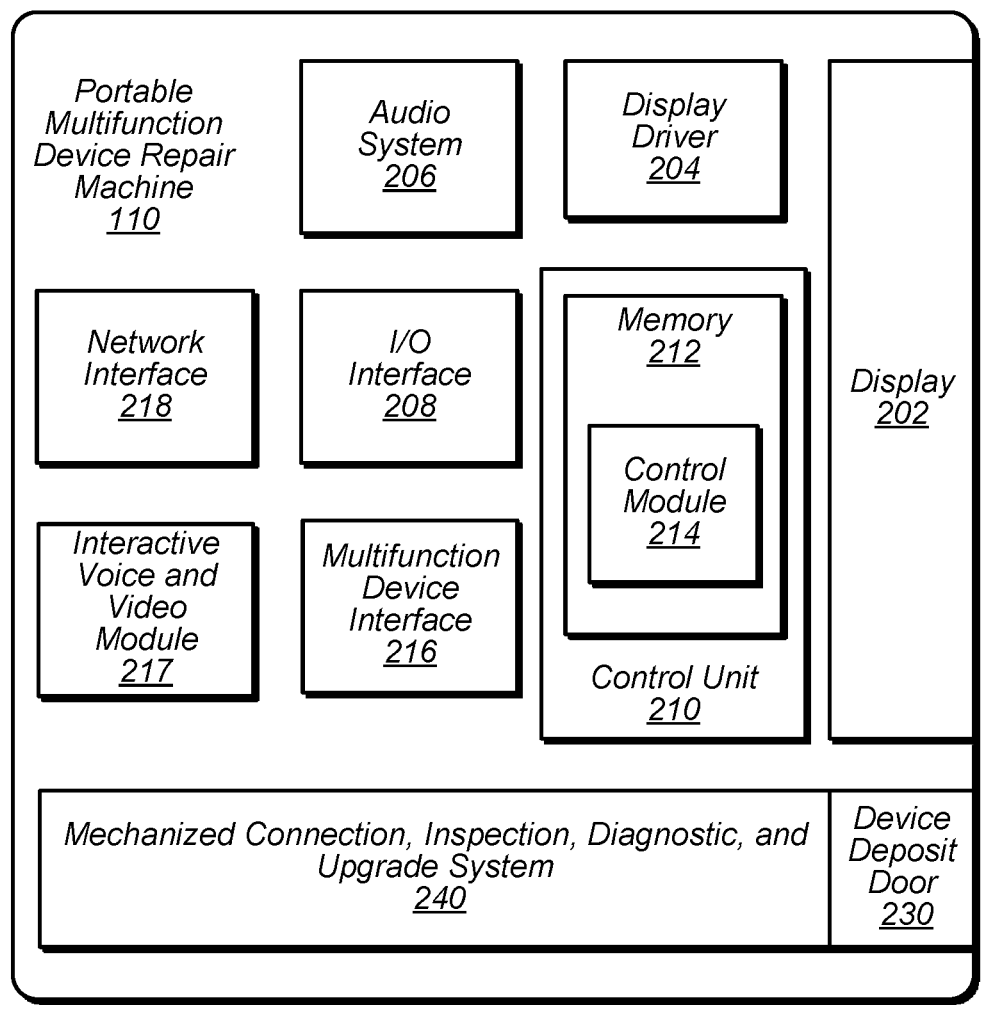
FIG. 2 is a block diagram of a portable multifunction device repair machine for mechanized automation of diagnostics and upgrades for portable multifunction devices, according to some embodiments.

FIG. 2 is a block diagram of a portable multifunction device repair machine for mechanized automation of diagnostics and upgrades for portable multifunction devices, according to some embodiments. The portable multifunction device repair machine 110 may perform some or all of the processes illustrated in FIGS. 6-9. The portable multifunction device repair machine 110 is illustrated with systems, components, interface and modules 202-240. The portable multifunction device repair machine 110 may be configured with more, fewer or difference components from those illustrated in FIG. 2. The illustrated systems, components, interface and modules 202-240 may be implemented via program instructions that are executed by one or more hardware device, in embodiments.

Interactive voice and video module 217 may be configured to allow the user to have an on-line real-time interactive voice and video communication with technical support staff (e.g., via the display screen of the repair machine 110). For instance the portable multifunction device repair machine 110 may be connected over various networks (e.g., the Internet) to a location with technical support staff. The user interface module (e.g., 420) may be configured to display a live image of technical support staff via the display 202 or to generate a live telephone call with the technical support staff, for example. The live images or the telephone call may be performed in real-time with the user's interaction with the repair machine and/or in real-time with the actual support being provided by the technical staff.

Figure 3:
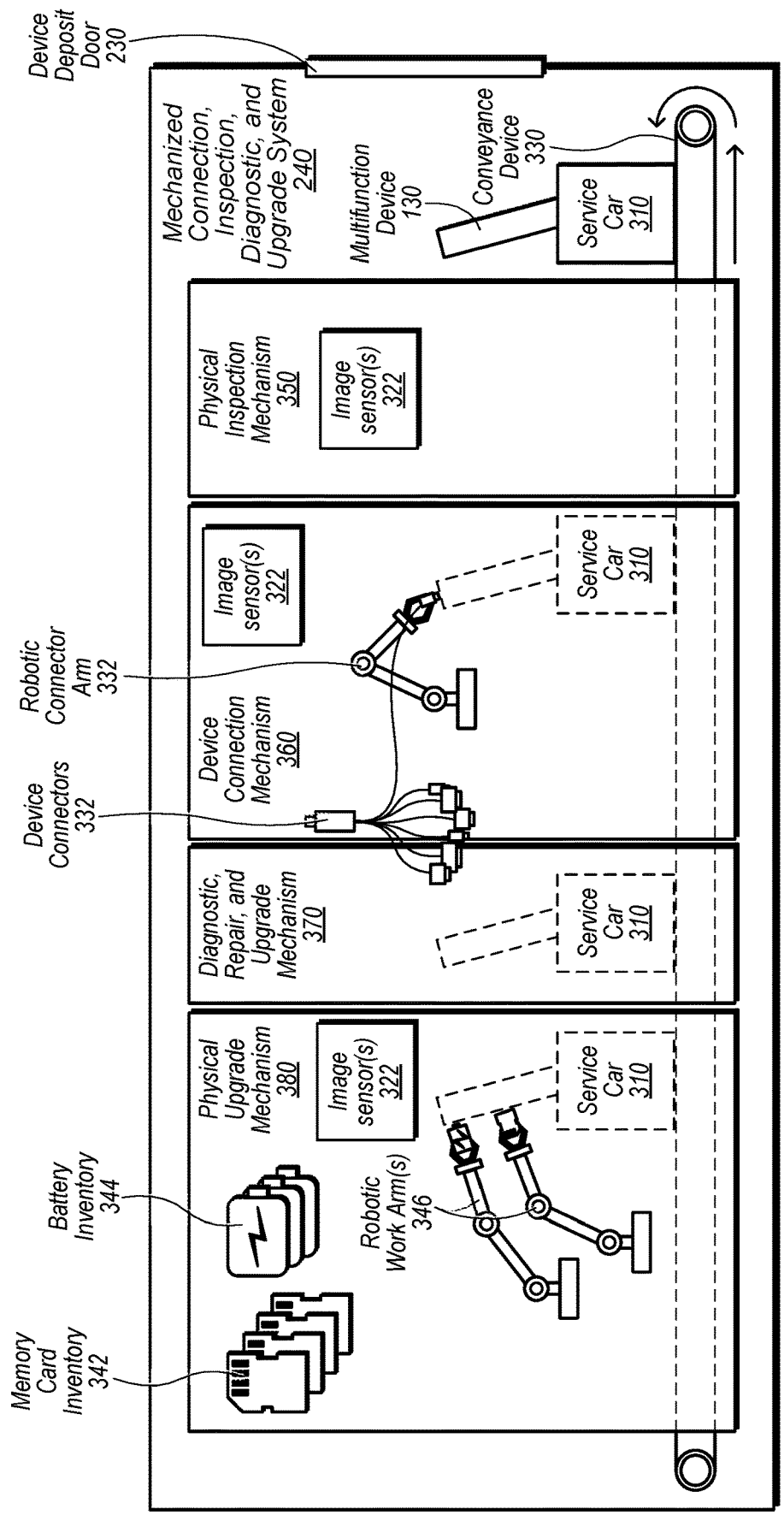
FIG. 3 is a block diagram of a mechanized connection, inspection, diagnostic, and upgrade system of a device for mechanized automation of diagnostics and upgrades for portable multifunction devices, according to some embodiments.

FIG. 3 is a block diagram of a mechanized connection, inspection, diagnostic, and upgrade system 240 of a repair machine 110 for mechanized automation of diagnostics and upgrades for portable multifunction devices, according to some embodiments.

In the illustrated embodiment, mechanized connection, inspection, diagnostic and upgrade system 240 is depicted with a multifunction device 130 that has been received from a user (via device deposit door 230) into a service car 310 on conveyance device 330. In embodiments, the service car 310 and the conveyance device 330 act as a conveyance mechanism to transport the multifunction device to and from various stations (e.g., physical inspection mechanism 350, device connection mechanism 360, upgrade mechanism 370 and/or physical upgrade mechanism 380) within a portable device repair machine 110. The depicted various stations (e.g., physical inspection mechanism 350, device connection mechanism 360, upgrade mechanism 370 and/or physical upgrade mechanism 380) within portable device repair machine 110 may be arranged in a different manner from that depicted. For example, the mechanisms and associated functionality of one station (e.g., device connection mechanism 360) may be combined with the mechanisms and/or functionality associated with another station (e.g., physical inspection mechanism 350).

Other forms of mechanized movement may be provided to move the multifunction device within a repair machine (e.g., robotic arms or the like) without departing from the scope of this disclosure. The conveyance device 330 may be controlled by the control module 210. For example, a conveyance control module (e.g., 440) may receive instructions from other modules instructing conveyance. The conveyance control module 440 may instruct the conveyance device 330 to operate. Operation of the conveyance device may cause the multifunction device 330 to be conveyed to a station in the repair machine.

In some embodiments, the multifunction device may be held relatively still (e.g., by a robotic arm or other mechanism), while a mechanical device performs some or all of the various tasks associated with the functionality describe herein. For example, a mechanism may be equipped with various mechanisms (e.g., tools, machinery, robotic arms) such that the various mechanisms come to the multifunction device, instead of the device being conveyed to the mechanisms.

The mechanized connection, inspection, diagnostic, and upgrade system 240 is illustrated with physical inspection mechanism 350 that includes at least one or more image sensors 322. In some embodiments, some or all of the process illustrated in FIG. 6, described below, may be performed by physical inspection mechanism 350. In some embodiments, various modules of the control module 202 may send data to, receive data from and/or analyze data and provide output based on the data from one or more process performed by the physical inspection mechanism 350. Physical inspection mechanism 350 may be configured with other components than those depicted. For example, physical inspection mechanism 350 may include one or more remote controlled mechanical devices and/or cameras such that a remote repair technician (e.g., located at a remote facility, but connected to the repair machine over one or more networks) may view the multifunction device 130 and interact with the device 130 in real time with the view. For example, the technician may interact with a user interface to instruct a mechanical mechanism (e.g., a robotic arm) to operate the multifunction device 130, such as pressing buttons of the multifunction device or orienting the multifunction device with respect to the camera. The mechanized connection, inspection, diagnostic, and upgrade system 240 is illustrated with device connection mechanism 360. In embodiments, device connection mechanism 360 may perform one or more steps of the process illustrated in FIG. 7. Various components of the device connection mechanism 360 may be controlled by modules of the control module. For example, the automation control module 430 may receive instructions from the device connection module 460 instructing what type of connector to use to connect to the multifunction device 330. The automation control module 430 may instruct a mechanical device to operate so as to connect the connector to the multifunction device 130. For example, the automation control module 430 may instruct one or more robotic connector arms to move such that one or more device connectors 332 are connected to the multifunction device. In some embodiments, more than one connector may be connected to the multifunction device 130, for example, a power cable, a data cable, and/or a diagnostic cable.

The mechanized connection, inspection, diagnostic, and upgrade system 240 is illustrated with diagnostic, repair, and upgrade mechanism 370. In some embodiments, the upgrade mechanism 370 may perform some or all of the process illustrated in FIG. 8. For instance, the upgrade mechanism may electronically diagnose the connected multifunction device 130, provide the results for display to the user, and respond to user selection of one or more processes to be performed on the multifunction device 130 by performing the selected process (e.g., repairing, upgrading, etc.). In embodiments, the diagnostic repair, and upgrade module may include logic (e.g., program instructions that may be executed by one or more hardware processors or other device) for instructing and/or performing diagnostics, repairing and/or upgrading the multifunction device 130.

The mechanized connection, inspection, diagnostic, and upgrade system 240 is illustrated with physical mechanism 380. In some embodiments, the physical upgrade mechanism 380 may perform or instruct (e.g., program instructions that may be executed by one or more hardware processors or other device) some or all of the process illustrated in FIG. 9. For instance, the physical upgrade mechanism 380 may receive an indication of a user selection of a physical upgrade option presented via the user interface of repair machine 110. The physical upgrade mechanism 380 may respond by sending instructions to the automation control module 430 such that the operations selected by the user are carried out on the multifunction device 130. For instance, the user may have selected a battery upgrade for the device 130. The physical upgrade module may retrieve instructions on how to perform the battery upgrade for the particular device 130 (e.g., from a data store of device-dependent instructions or from a manufacturer of the device or otherwise), turn those instructions into commands for the automation control module, and send the commands to the automation control module 430. The automation control module 430 may receive the commands and instruction one or more mechanical devices (e.g., robotic work arms 346 or the like) to perform one or more operations to remove the old battery and install a new battery in device 130. In some embodiments the robotic work arms 346 may be controlled remotely (by one or more technicians at a remote site). For instance, a technician may be provided an indication of the upgrade selected by the device 130 user and the technician may instruct one or more mechanical device to perform the upgrade. For example, the technician may view the device 130 via image sensors 322 and direct a robotic arm to remove the cover and battery and install the new battery and replace the cover, based on the feedback provided via the image sensors 322. In some instances, instead of preprogrammed commands (e.g., multifunction device-dependent commands for performing various upgrades or the like) the technician may directly control the mechanism (e.g., robotic work arms 346) to perform the upgrades. Other physical upgrades may be performed (e.g., memory card upgrades, CPU upgrades, etc.) without departing from the scope of this disclosure.

Figure 4:
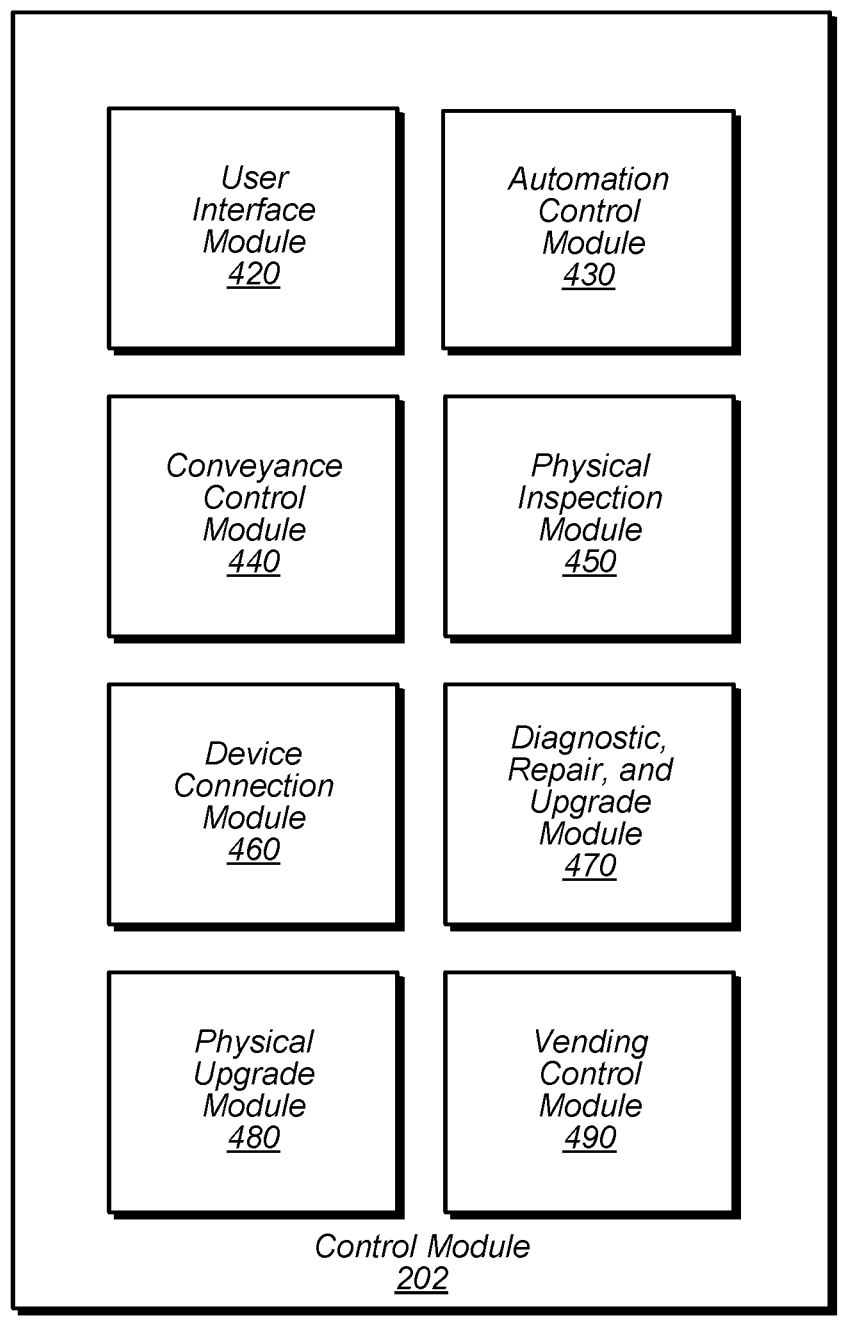
FIG. 4 is a block diagram of a control module for a device for mechanized automation of diagnostics and upgrades for portable multifunction devices, according to some embodiments.

FIG. 4 is a block diagram of a control module for a device for mechanized automation of diagnostics and upgrades for portable multifunction devices, according to some embodiments. Control module 202 may be configured with more, fewer, or different modules than those depicted. In embodiments, the modules may include program instructions that are executed by hardware computing devices to perform some or all of the functionality illustrated in FIGS. 5-9. Various steps of the illustrated processes may be performed by one or more of the modules, working in conjunction with one another, for example.

FIG. 4 is depicted with user interface module 420, automation control module 430, conveyance control module 440, physical inspection module 450, device connection module 460, diagnostic, repair, and upgrade module 470, physical upgrade module 480 and vending control module 490.

User interface module 420 may be configured to instruct various components of the portable multifunction device repair machine 110 to facilitate communications between the repair machine 110 and the user of the portable device 130. For example, the user interface module 420 may instruct display of various prompts via display 202 and/or instruct audio communications with a user of the repair machine 110. Also, the user interface may receive input from the user. For example, user input (e.g., selection of an option or response to a prompt) may be received via the display 202 (e.g., via touch-based gestures) via physical buttons or switches of the repair machine, In some embodiments, the user interface module 420 may be configured to provide a graphical user interface (GUI) via the repair machine display 202.

Automation control module 430 may be configured to control automation of various automated processes of the repair machine 110. For example, automation control module 430 may be configured with program instructions that control various physical processes of the mechanized connection, inspection, diagnostic, and upgrade system 240. Automation control module 430 may be configured to control robotic arms or other physical mechanisms that perform one or more of the processes described herein. For example, control software for movement of the robotic arms may be part of the automation control module 430. In embodiments, the automation control module 430 may communication back and forth with the other modules (e.g., conveyance control module 440, physical inspection module 450, device connection module 460, diagnostic, repair and upgrade module 470, physical upgrade module 480 and/or vending control module 490 to instruct performance of functionality associated with the respective modules.

Conveyance control module 440 may be configured to control conveyance of portable device 130 within the repair machine 110. For example, device 130 may be moved or otherwise processed within repair machine 110 as instructed by conveyance control module 440. In FIG. 3, for example, multifunction device 130 is illustrated in a service car 310 that is on conveyance device 330. Conveyance control module 440 may instruct or otherwise control or direct one or more of the combination of the service car and/or conveyance device to move the multifunction device 130 from or to the device deposit door 230 where the device 130 was deposited into the repair machine 110. For instance, conveyance control module 440 may instruct the conveyance device 330 to convey the multifunction device to the physical inspection mechanism 350 responsive to deposit of the device 130 in the service car via the deposit door. Similarly, the conveyance control module 440 may instruct the conveyance mechanism to transport the portable device 130 to other areas, stations or mechanisms within the repair machine 110.

Physical inspection module 450 may be configured to perform physical inspection of the deposited portable device 130. In some instances physical inspection module 450 may perform one or more steps of the process illustrated in FIG. 6. For example, physical inspection module 450 may instruct that one or more images of the portable device 130 be obtained. Additionally, the physical inspection module may instruct the images to be analyzed (e.g., via computer vision). The instructed inspection process may include determining (and storing) one or more characteristics of the portable device (e.g., via the computer vision). For instance, the inspection process may determine that the glass screen of the portable device is cracked or may determine a manufacturer and/or model number of the portable device. Such information may be used by the physical inspection module 450 or the other modules to perform various functionality such as diagnose or identify the portable device.

Device connection module 460 may be configured to direct connection of the deposited portable device to any of various connectors (e.g., 332) in the repair machine. In some instances, device connection module 460 may perform some or all of the steps illustrated in FIG. 7, for example. For instance, a portable device may include any of various connectors for connecting to the portable device (e.g., connectors to charge the portable device and/or connectors to create a wired data connection to the portable device and/or connectors to attach audio/video equipment to the portable device). Note that in some embodiments, a deposited portable device may include a wireless connection (e.g., wireless connectors to charge the portable device and/or wireless connectors to create a wired data connection to the portable device and/or connectors to attach audio/video equipment to the portable device).

In some embodiments, device connection module 460 may obtain, (e.g., from a data store) the type of connector for the deposited device. For instance, once the type of device has been determined (e.g., based on physical inspection and/or via prompting a response on the display) the device connection module 460 may look up the type of connector for the determined device from entries in a data store that specify the connector type for the deposited device. The device connection module may then instruct a connection mechanism (e.g., device connection mechanism 360) to connect the deposited portable device using the specified connector type (e.g., one of device connectors 332). In some instances, the machine or computer vision capabilities of the repair machine may be called upon to recognize a connector type for the portable device. In embodiments, the device connection module may interact with automation control module 430 to instruct one or more mechanical devices (e.g., robotic arms or the like) to physically connect a device connector to the portable device.

Device connection module may establish a data connection with the portable device. For instance, a data connection may be established over a wireless link to the portable device (e.g., via Bluetooth or Wi-Fi) or via the physical connection to the portable device.

Diagnostic, repair, and upgrade module 470 may be configured to diagnose, repair and/or upgrade the portable device 130. In some embodiments, the upgrade module 470 may perform one or more of the steps illustrated in FIG. 8, described below. For instance, once a data connection has been established with the portable device, the upgrade module 470 may test or otherwise diagnose the portable device 130 to determine repairs, upgrades or the like for the portable device. In some instances, the upgrade module 470 may be configured to obtain one or more diagnostic algorithms (e.g., from a diagnostic algorithm data store or from the manufacturer of the device) for the portable device and perform the algorithm on the device. In some embodiments, the upgrade module 470 may trigger a diagnostic procedure within the portable device. Results from the diagnostics may be combined with results from the physical inspection (or not combined) and provided to the user interface module to display as a list of selectable services that the repair machine may offer to the user.

In some embodiments, the upgrade module 470 may determine (e.g., based upon the physical inspection and/or diagnostics that the portable device is eligible for an upgrade. A non-exhaustive list of upgrades may include a battery, a memory card, a SIM card, a protective cover, or the like. In some instances (e.g., where the repair machine has the battery, memory card, SIM card or protective cover) the repair machine may offer to sell and/or install an upgrade on the spot. In some instances, the upgrade may be performed by the repair device. In some instances, the repair device may determine that while the portable device is eligible for an upgrade (or is in need of a repair) the repair or upgrade is not immediately available (e.g., the repair machine does not have the parts, cannot perform the service, or is currently busy repairing another device) and may offer to collect payment for the repair, service or upgrade and provide the portable device back to the user at a later time (e.g., via mail or at the same location at a later date). In some embodiments, the repair machine may provide the part (e.g., the battery, SIM card or memory card) to the user without installing the upgrade on the device. In such circumstances, the user interface of the repair machine may provide instructions for the user of the portable device to install the upgrade, in embodiments.

The physical upgrade module 480 may interoperate with the automation control module and the mechanized connection, inspection, diagnostic and upgrade system 240 to perform various upgrades to the portable device. In some embodiments, the physical upgrade module may perform the physical upgrade process illustrated in FIG. 9, described below.

In embodiments, the physical upgrade module may be configured to receive an instruction to perform a physical upgrade to a portable device. The physical upgrade module 480 may be configured to obtain (e.g., from a data store of upgrade instructions) instructions describing how to perform one or more upgrades to a particular device and may instruct (e.g., via interaction with automation control module 430) various mechanisms (e.g., robotic arms) to perform the physical upgrade according to the instructions. In some embodiments, the physical upgrade module may be configured to obtain an upgrade component from inventory in the repair machine and install the upgrade component to the portable device in accordance with the instructions.

Vending control module 490 may be configured to control vending of various portable device components (e.g., batteries, memory cards, covers, battery chargers, etc.) from the repair machine. For instance, the user interface module 420 may be configured to prompt a user to selection a device component for purchase and receive back an indication of the user's selection of a particular component. The user interface may prompt the user for payment, and upon confirmation of payment, the vending control module 490 may instruct release of the particular component from inventory (e.g., inventory 112) to vending door 132.

Figure 5:
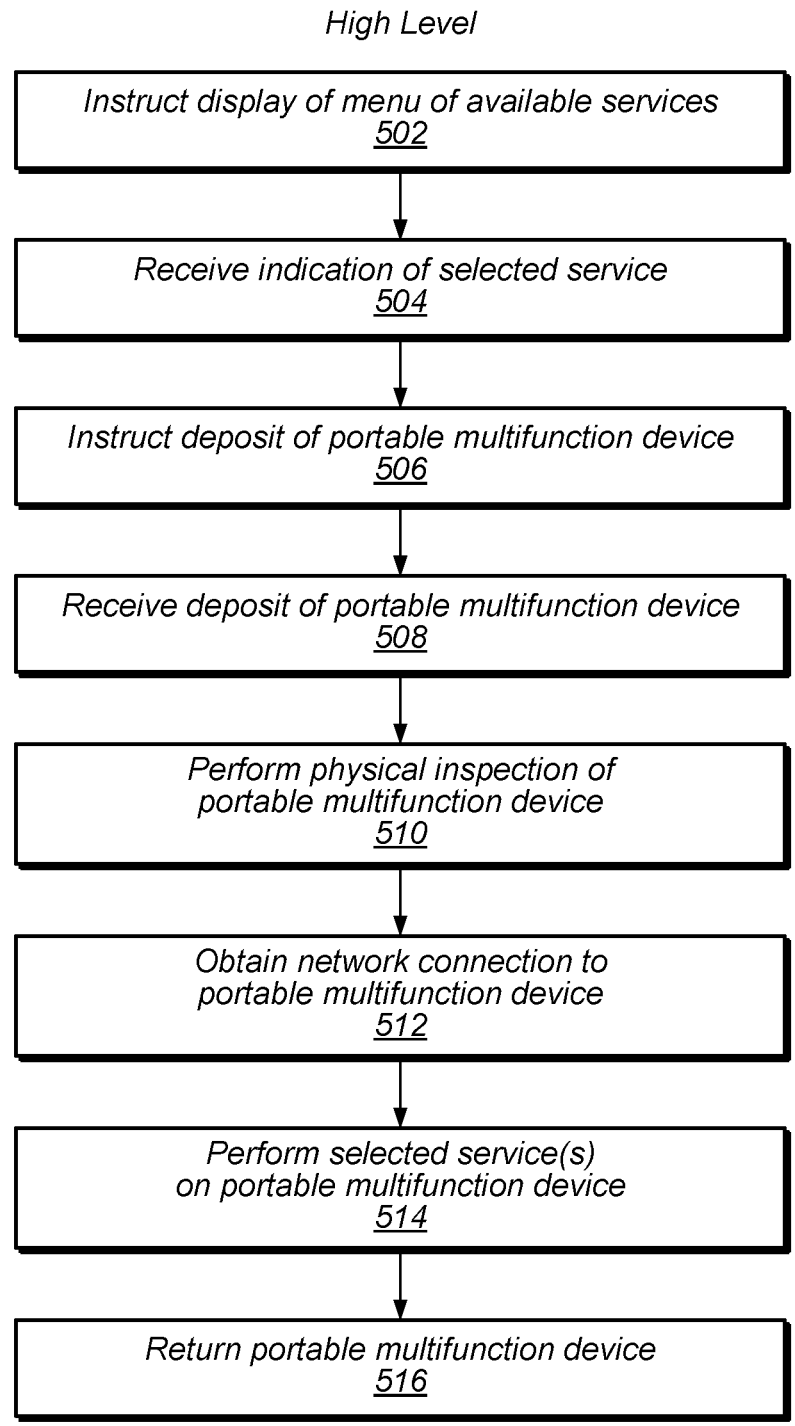
FIG. 5 is a flow diagram of a process for mechanized automation of diagnostics and upgrades for portable multifunction devices, according to some embodiments.

FIG. 5 is a flow diagram of a process for mechanized automation of diagnostics and upgrades for portable multifunction devices, according to some embodiments. The illustrated process may be directed by one or more modules or components of portable multifunction device repair machine 110 (e.g., illustrated in FIG. 2). In embodiments, the illustrated process may be performed by a portable device repair machine. For example, the control unit 210 may instruct or direct a conveyance mechanism (e.g., conveyance device 330 and/or service car 310) to convey the device 130 to one or more stations of a mechanized connection, inspection, diagnostic and upgrade system 240 of the portable device repair machine 110.

Display of a menu of available services may be instructed (block 502). An indication of a selected service may be received (block 504). Deposit of the portable multifunction device may be instructed (block 506). Deposit of the portable multifunction device may be received (block 508). A physical inspection of the portable multifunction device may be performed (block 510). A network connection to the portable multifunction device may be obtained (block 512). Selected services may be performed on the portable multifunction device (block 514). The portable multifunction device may be returned (block 516).

Figure 6:
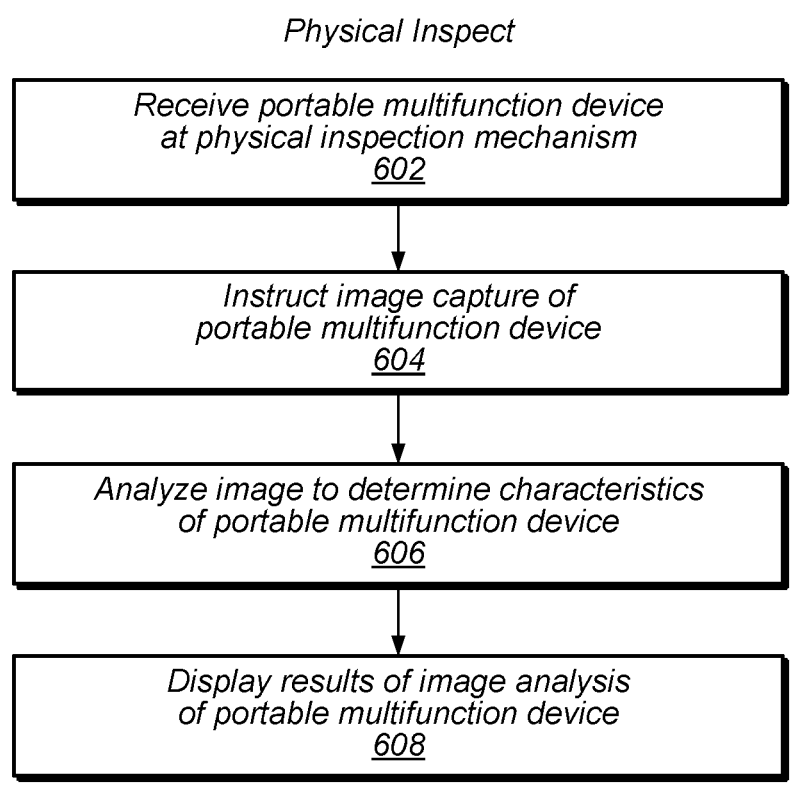
FIG. 6 illustrates flow diagram of a physical inspection process for mechanized automation of diagnostics and upgrades for portable multifunction devices, according to some embodiments.

FIG. 6 illustrates flow diagram of a physical inspection process for mechanized automation of diagnostics and upgrades for portable multifunction devices, according to some embodiments. The illustrated process may be directed by one or more modules or components of portable multifunction device repair machine 110 (e.g., illustrated in FIG. 2). In embodiments, the illustrated process may be performed by a physical inspection mechanism (e.g., 350). For example, the control unit 210 may instruct or direct a conveyance mechanism (e.g., conveyance device 330 and/or service car 310) to convey the device 130 to the physical inspection mechanism (e.g., 350).

At block 602, a portable multifunction device (e.g., 130) may be received at the physical inspection mechanism (e.g., 350). Image capture of the portable multifunction device may be instructed (block 604). The image may be analyzed to determine characteristics of the portable multifunction device (block 606). Results of the image analysis of the portable multifunction device may be displayed (block 608).

Figure 7:
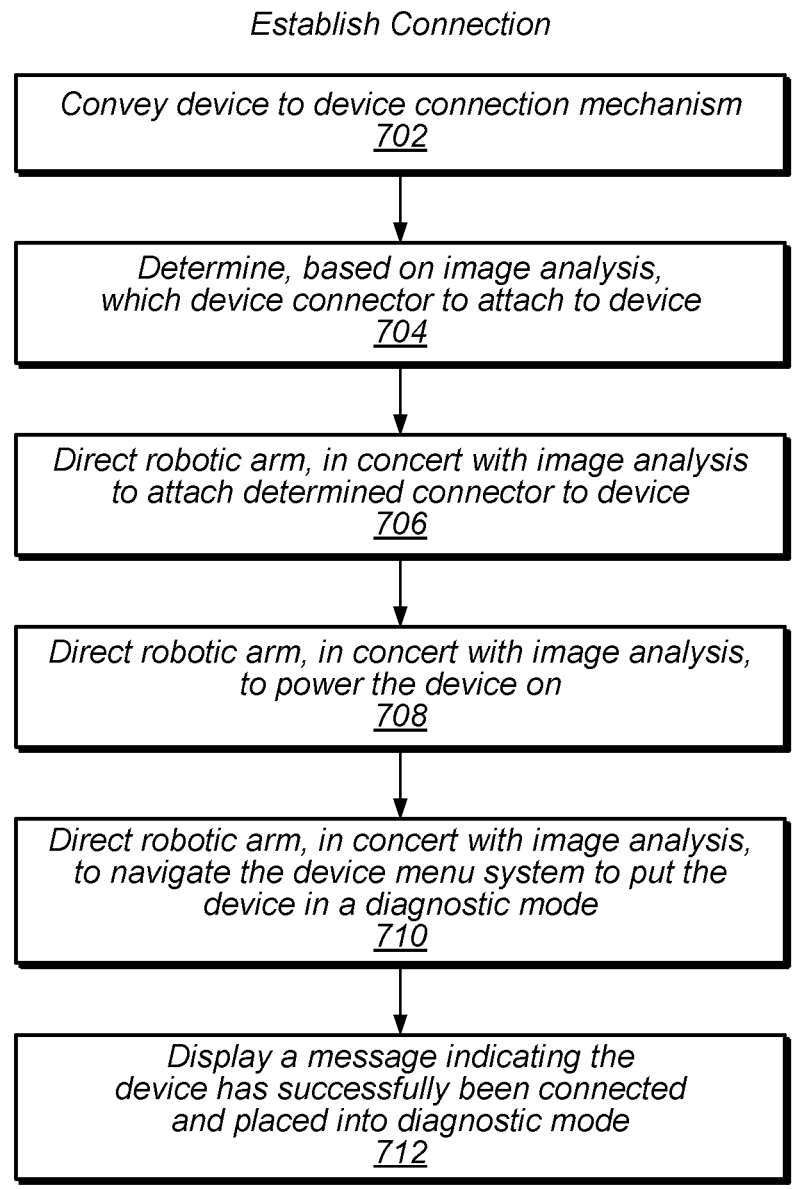
FIG. 7 illustrates flow diagram of a process for establishing a connection between a portable multifunction device and a device for mechanized automation of diagnostics and upgrades for portable multifunction devices, according to some embodiments.

FIG. 7 illustrates flow diagram of a process for establishing a connection between a portable multifunction device and a device for mechanized automation of diagnostics and upgrades for portable multifunction devices, according to some embodiments. The illustrated process may be directed by one or more modules or components of portable multifunction device repair machine 110 (e.g., illustrated in FIG. 2). In embodiments, the illustrated process may be performed by a device connection mechanism 360.

The portable multifunction device (e.g., device 130) may be conveyed to the device connection mechanism (block 702). For example, the control unit 210 may instruct or direct a conveyance mechanism (e.g., conveyance device 330 and/or service car 310) to convey the device 130 to device connection mechanism 360. Based on image analysis, a determination may be made for which device connector to attach to the portable device 130 (block 704). A robotic arm may be directed to, in concert with image analysis, attach the determined connector to the portable device 130 (block 706). A robotic arm may be directed, in concert with image analysis to power the device on (block 708). A robotic arm may be directed, in concert with image analysis, to navigate the device menu system to put the device in a diagnostic mode (block 710). A message may be displayed indicating the device has successfully been connected and placed into the diagnostic mode (block 712).

Figure 8:
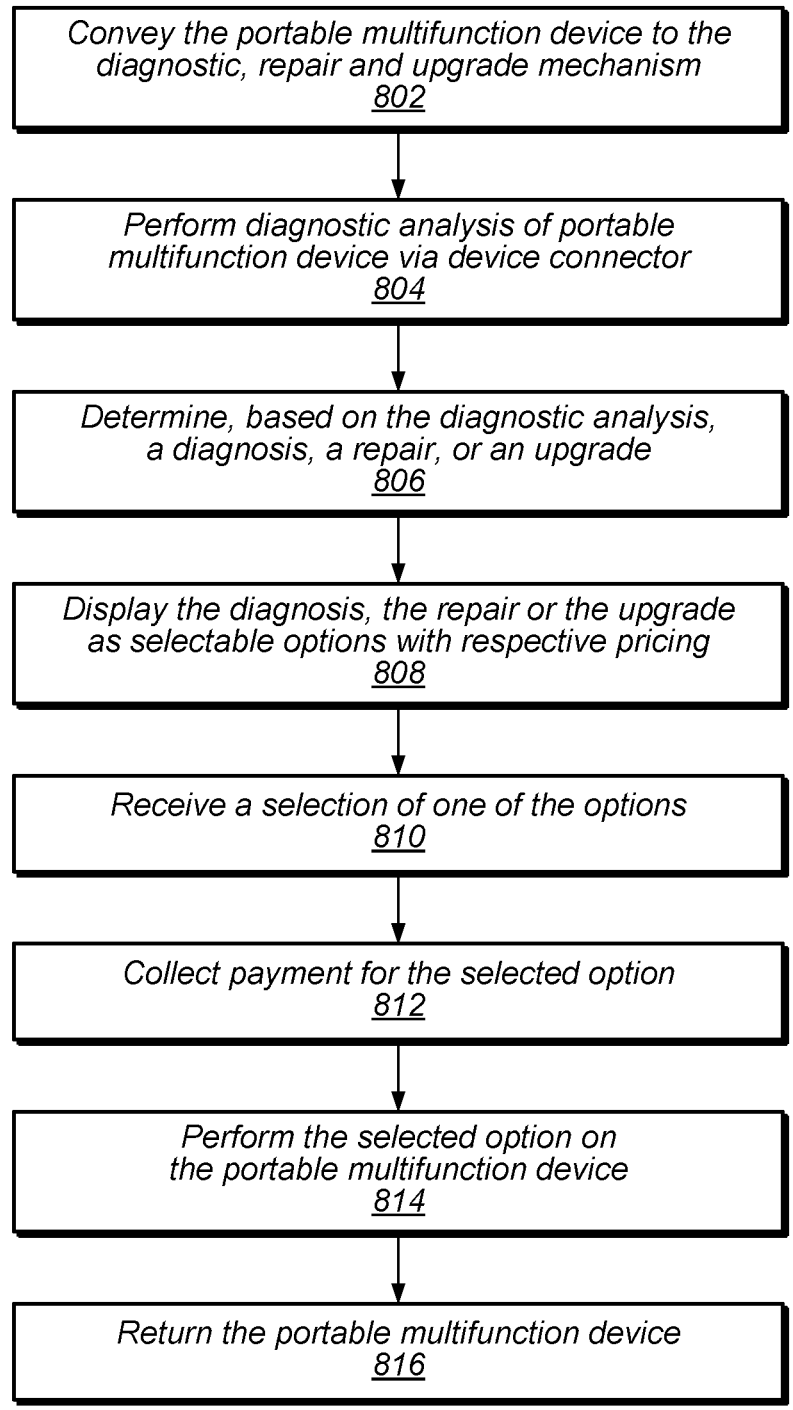
FIG. 8 illustrates flow diagram of a process for diagnostics for a portable multifunction device that is performed by a device for mechanized automation of diagnostics and upgrades for portable multifunction devices, according to some embodiments.

FIG. 8 illustrates flow diagram of a process for diagnostics for a portable multifunction device that is performed by a device for mechanized automation of diagnostics and upgrades for portable multifunction devices, according to some embodiments. The illustrated process may be directed by one or more modules or components of portable multifunction device repair machine 110 (e.g., illustrated in FIG. 2). In embodiments, the illustrated process may be performed by a diagnostic, repair, and upgrade mechanism 370.

The portable multifunction device (e.g., device 130) may be conveyed to the diagnostic, repair and upgrade mechanism (block 802). For example, the control unit 210 may instruct or direct a conveyance mechanism (e.g., conveyance device 330 and/or service car 310) to convey the device 130 to the diagnostic, repair, and upgrade mechanism 370. Diagnostic analysis of the portable device may be performed (e.g., via the device connector) (block 804). Based on the diagnostic analysis, a diagnosis, repair or upgrade may be determined (block 806). The diagnosis, repair or upgrade may be displayed as selectable options with respective pricing (block 808). A selection of one of the options may be received (block 810). Payment for the selected option may be collected (block 812). The selected option may be performed on the portable multifunction device (block 814). The portable multifunction device may be returned (block 816).

Figure 9:
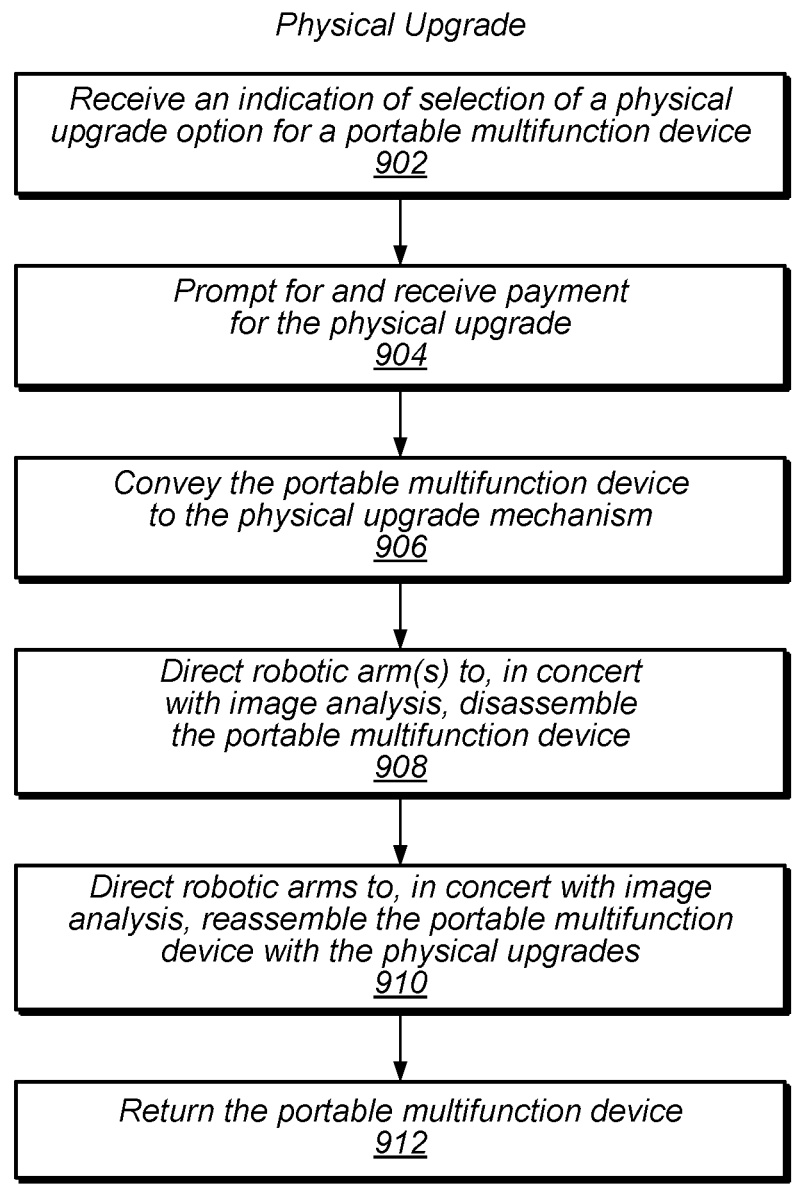
FIG. 9 illustrates flow diagram of a process for performing a physical upgrade on a portable multifunction device by a device for mechanized automation of diagnostics and upgrades for portable multifunction devices, according to some embodiments.

FIG. 9 illustrates flow diagram of a process for performing a physical upgrade on a portable multifunction device by a device for mechanized automation of diagnostics and upgrades for portable multifunction devices, according to some embodiments. The illustrated process may be performed by a portable multifunction device repair machine 110, in embodiments. For example, the physical upgrade process may be performed by the physical upgrade mechanism 380 of the mechanized connection, inspection, diagnostic, and upgrade system 240 of the portable multifunction device repair machine 110, in embodiments. The physical upgrade process may be controlled by control module 214 (e.g., a control module implemented via program instructions that are executed by one or more hardware devices), in embodiments.

In the illustrated process of FIG. 9, an indication of selection of a physical upgrade option for a portable multifunction device is received (block 902). For example, a user may interact with a user interface (e.g., video, audio, physical buttons or the like) of the portable multifunction device repair machine 110 to select a physical upgrade option from a list of prompted options. The device performing the physical upgrade may prompt for and receive payment (e.g., via the user interface) for the physical upgrade (block 904). In some embodiments, the portable device repair machine 110 may be connected (e.g., via network or networks 140, 1085) to an automated money machine (e.g., 120). In some such embodiments, the portable device repair machine 110 may be configured to communicate with the automated money machine 120 to coordinate payment. For example, the automated money machine 120 may accept physical money or account information (e.g., via a credit or debit card) from a user and coordinate payment for the products and/or service provided by the portable device repair machine 110 with the portable device repair machine 110. In some instances, the user interface of the portable device repair machine 110 may instruct the portable device user to make payment via the automated money machine 120. The portable device repair machine may coordinate with the automated money machine 120 to verify that payment has been received prior to performing the selected services or providing the selected product, for example.

The portable multifunction device may be conveyed to the physical upgrade mechanism (block 906). For instance, control unit 210 (e.g., implemented via program instructions that are executed via one or more hardware devices) may instruct a physical transport mechanism (e.g., conveyance device 330 and service car 310) to move the portable multifunction device to the physical upgrade mechanism 380.

A mechanized device (e.g., robotic arms or the like) may be directed to, in concert with image analysis, disassemble the portable multifunction device (block 908). For example, one or more physical mechanisms within the physical upgrade mechanism 380 may be instructed by control unit 210 to remove various parts of the portable multifunction device 130 (e.g., remove the battery cover, pull a cover for a SIM card opening, etc.). One or more physical mechanisms (e.g., robotic arms or other physical mechanism) may be directed to, in concert with image analysis, reassemble the portable multifunction device (e.g., with the physical upgrades such as a new battery or SIM card or memory card or the like installed as part of the reassembly process). For instance, the robotic arms (or other physical mechanism) may be directed by control unit 210 to reassemble the portable multifunction device with a new battery. The portable multifunction device 130 may be returned (block 912). For instance, the portable multifunction device 130 may returned via the service car and conveyance device 330 to device deposit door 230 such that the portable multifunction device can be obtained by a user of the device 130.

Example Computer System

Figure 10:
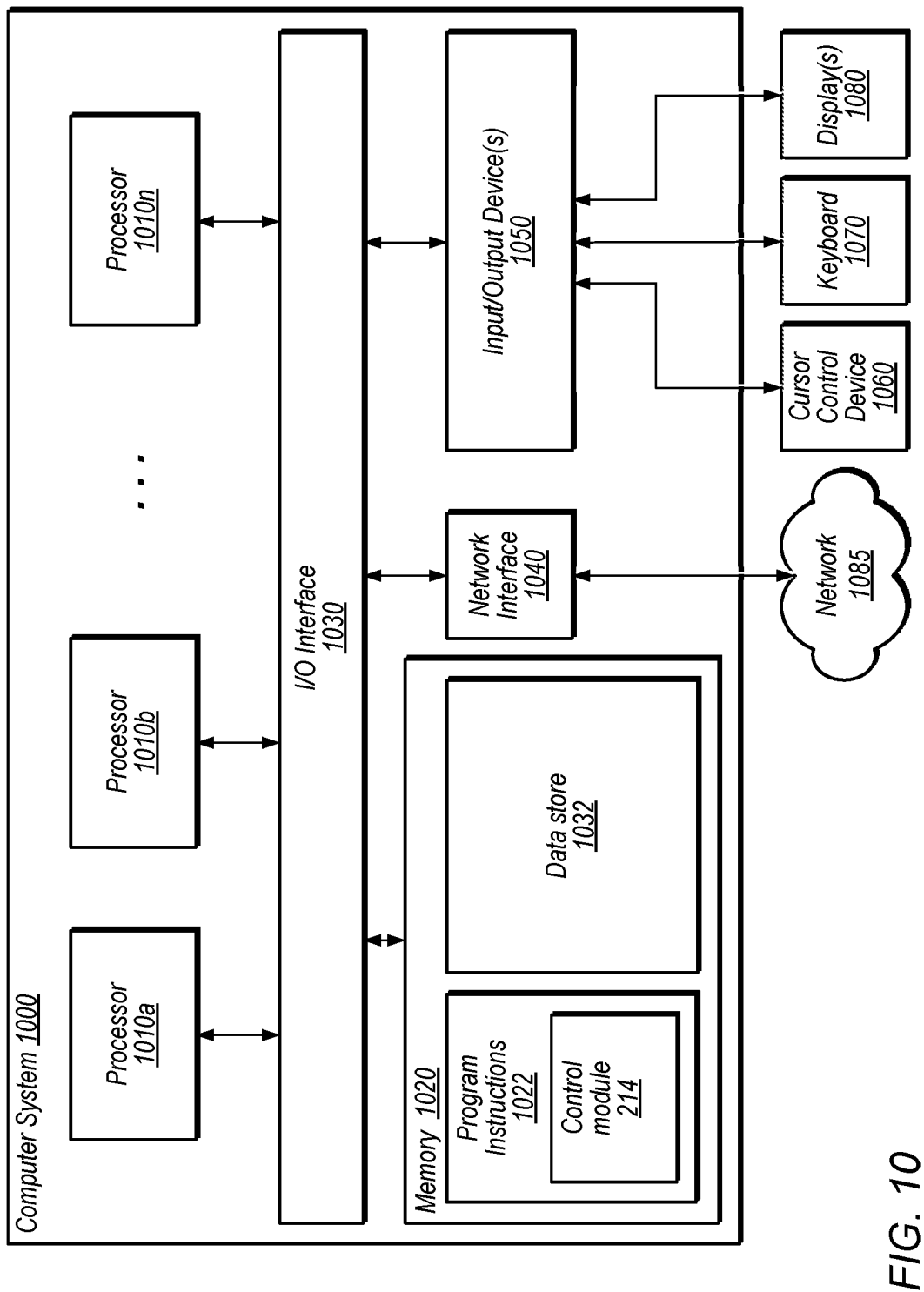
FIG. 10 illustrates an example computer system configured to implement aspects of the device for mechanized automation of diagnostics and upgrades for portable multifunction devices.

FIG. 10 illustrates computer system 1000 that is configured to execute any or all of the embodiments described above (e.g., the portable device repair machine 110). In different embodiments, computer system 1000 may be any of various types of devices, including, but not limited to, a device for mechanized automation of diagnostics and upgrades for portable multifunction devices (e.g., the portable device repair machine 110).

Various embodiments of a system and method associated with a device for mechanized automation of diagnostics and upgrades for portable multifunction devices, as described herein, may be executed on one or more computer systems 1000, which may interact with various other devices. Note that any component, action, or functionality described above with respect to FIGS. 1-9 may be implemented on one or more computers configured as computer system 1000 of FIG. 10, according to various embodiments. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some cases, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store program instructions 1022 and/or data store 1032 accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions 1022 may be configured to implement a control module 214 incorporating any modules, interfaces or the like that implement the functionality described above. Additionally, data store 1032 may include any of the information or data structures described above. In some embodiments, program instructions and/or data may be received, sent or stored upon different types of computer-accessible media or on similar media separate from system memory 1020 or computer system 1000. While computer system 1000 is described as implementing the functionality of functional blocks of previous Figures, any of the functionality described herein may be implemented via such a computer system.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network 1085 (e.g., carrier or agent devices) or between nodes of computer system 1000. Network 1085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or accessing data by one or more computer systems 1000. Multiple input/output devices 1050 may be present in computer system 1000 or may be distributed on various nodes of computer system 1000. In some embodiments, similar input/ output devices may be separate from computer system 1000 and may interact with one or more nodes of computer system 1000 through a wired or wireless connection, such as over network interface 1040.

As shown in FIG. 10, memory 1020 may include program instructions 1022, which may be processor-executable to implement any element or action described above. Some or all of the software components or modules may comprise program instructions that are executed by one or more hardware devices to perform the functionality described herein. In one embodiment, the program instructions may implement the methods described above, such as the methods illustrated by FIGS. 5-9. In other embodiments, different elements and data may be included. Note that data store 1032 may include any data or information described above.

Those skilled in the art will appreciate that computer system 1000 is merely illustrative and is not intended to limit the scope of embodiments. In particular, the computer system and devices may include any combination of hardware or software that can perform the indicated functions, including computers, network devices, Internet appliances, servers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components or modules may execute in memory on another device and communicate with the illustrated computer system via inter-computer communication.

Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

Figure 11:
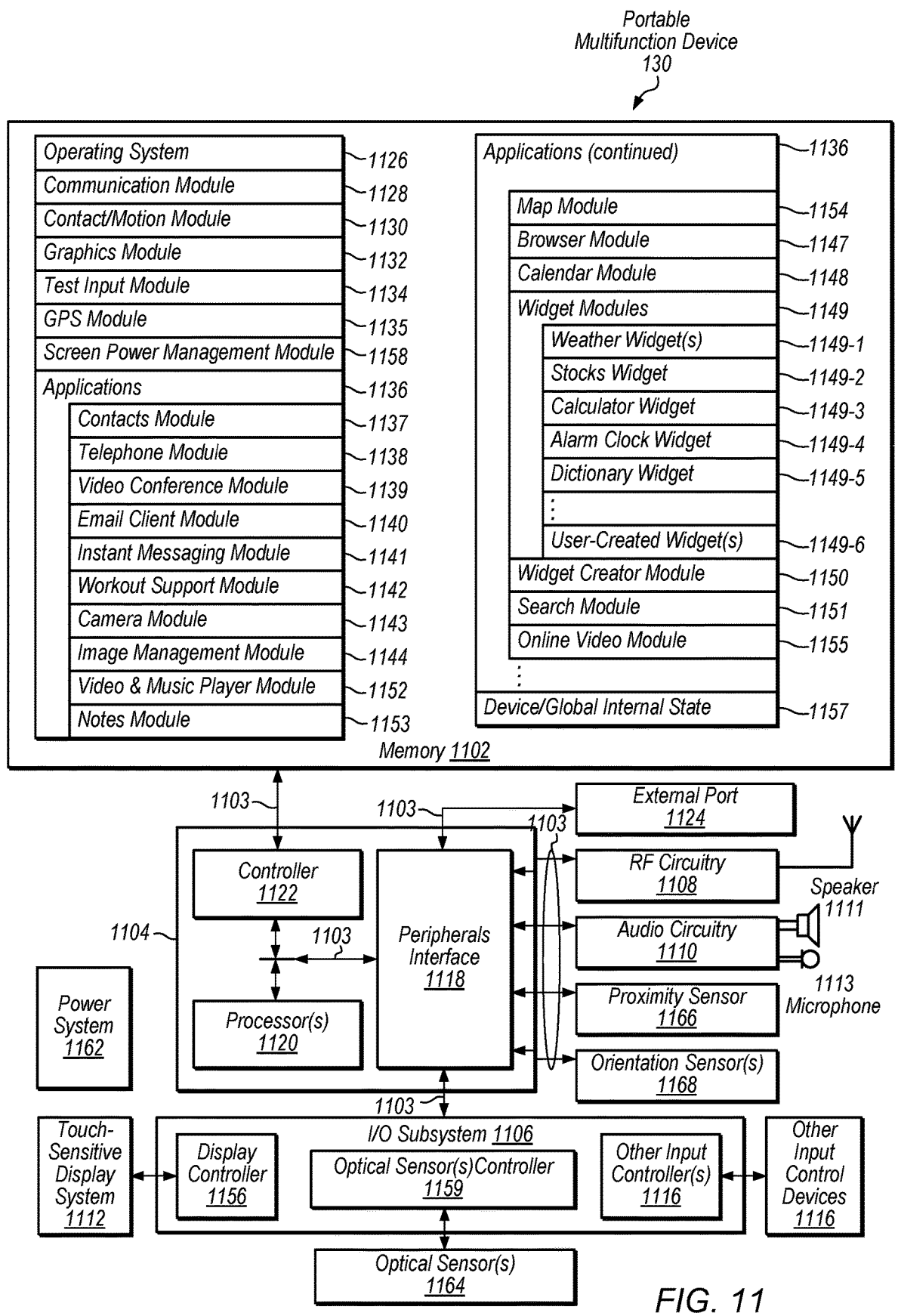
FIG. 11 illustrates a block diagram of a portable multifunction device, in some embodiments.

Attention is now directed toward embodiments of portable devices. FIG. 11 is a block diagram illustrating portable multifunction device 130 with touch-sensitive display 1112 in accordance with some embodiments. Touch-sensitive display 1112 is sometimes called a "touch screen" for convenience, and may also be known as or called a touch-sensitive display system. Portable multifunction device 130 may include memory 1102 (which may include one or more computer readable storage mediums), memory controller 1122, one or more processing units (CPU's) 1120, peripherals interface 1118, RF circuitry 1108, audio circuitry 1110, speaker 1111, microphone 1113, input/output (I/O) subsystem 1106, other input or control devices 1116, and external port 1124. Device 130 may include one or more optical sensors 1164. These components may communicate over one or more communication buses or signal lines 1103.

It should be appreciated that device 130 is only one example of a portable multifunction device, and that device 130 may have more or fewer components than shown, may combine two or more components, or may have a different configuration or arrangement of the components. The various components shown in FIG. 11 may be implemented in hardware, software, or a combination of hardware and software, including one or more signal processing and/or application specific integrated circuits.

Memory 1102 may include high-speed random access memory and may also include non-volatile memory, such as one or more magnetic disk storage devices, flash memory devices, or other non-volatile solid-state memory devices. Access to memory 1102 by other components of device 130, such as CPU 1120 and the peripherals interface 1118, may be controlled by memory controller 1122.

Peripherals interface 1118 can be used to couple input and output peripherals of the device to CPU 1120 and memory 1102. The one or more processors 1120 run or execute various software programs and/or sets of instructions stored in memory 1102 to perform various functions for device 130 and to process data.

In some embodiments, peripherals interface 1118, CPU 1120, and memory controller 1122 may be implemented on a single chip, such as chip 1104. In some other embodiments, they may be implemented on separate chips.

RF (radio frequency) circuitry 1108 receives and sends RF signals, also called electromagnetic signals. RF circuitry 1108 converts electrical signals to/from electromagnetic signals and communicates with communications networks and other communications devices via the electromagnetic signals. RF circuitry 1108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 1108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication.

The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 1110, speaker 1111, and microphone 1113 provide an audio interface between a user and device 130. Audio circuitry 1110 receives audio data from peripherals interface 1118, converts the audio data to an electrical signal, and transmits the electrical signal to speaker 1111. Speaker 1111 converts the electrical signal to human-audible sound waves. Audio circuitry 1110 also receives electrical signals converted by microphone 1113 from sound waves. Audio circuitry 1110 converts the electrical signal to audio data and transmits the audio data to peripherals interface 1118 for processing. Audio data may be retrieved from and/or transmitted to memory 1102 and/or RF circuitry 1108 by peripherals interface 1118. In some embodiments, audio circuitry 1110 also includes a headset jack. The headset jack provides an interface between audio circuitry 1110 and removable audio input/output peripherals, such as output-only headphones or a headset with both output (e.g., a headphone for one or both ears) and input (e.g., a microphone).

I/O subsystem 1106 couples input/output peripherals on device 130, such as touch screen 1112 and other input control devices 1116, to peripherals interface 1118. I/O subsystem 1106 may include display controller 1156 and one or more input controllers 1160 for other input or control devices. The one or more input controllers 1160 receive/send electrical signals from/to other input or control devices 1116. The other input control devices 1116 may include physical buttons (e.g., push buttons, rocker buttons, etc.), dials, slider switches, joysticks, click wheels, and so forth. In some alternate embodiments, input controller(s) 1160 may be coupled to any (or none) of the following: a keyboard, infrared port, USB port, and a pointer device such as a mouse. The one or more buttons (e.g., 208, FIG. 2) may include an up/down button for volume control of speaker 1111 and/or microphone 1113. The one or more buttons may include a push button (e.g., 206, FIG. 2).

Touch-sensitive display 1112 provides an input interface and an output interface between the device and a user. Display controller 1156 receives and/or sends electrical signals from/to touch screen 1112. Touch screen 1112 displays visual output to the user. The visual output may include graphics, text, icons, video, and any combination thereof (collectively termed "graphics"). In some embodiments, some or all of the visual output may correspond to user-interface objects.

Touch screen 1112 has a touch-sensitive surface, sensor or set of sensors that accepts input from the user based on haptic and/or tactile contact. Touch screen 1112 and display controller 1156 (along with any associated modules and/or sets of instructions in memory 1102) detect contact (and any movement or breaking of the contact) on touch screen 1112 and converts the detected contact into interaction with user-interface objects (e.g., one or more soft keys, icons, web pages or images) that are displayed on touch screen 1112. In an exemplary embodiment, a point of contact between touch screen 1112 and the user corresponds to a finger of the user.

Touch screen 1112 may use LCD (liquid crystal display) technology, LPD (light emitting polymer display) technology, or LED (light emitting diode) technology, although other display technologies may be used in other embodiments. Touch screen 1112 and display controller 1156 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 1112. In an exemplary embodiment, projected mutual capacitance sensing technology is used, such as that found in the iPhone®, iPod Touch®, and iPad® from Apple Inc. of Cupertino, Calif.

The user may make contact with touch screen 1112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 130 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 1112 or an extension of the touch-sensitive surface formed by the touch screen.

Device 130 also includes power system 1162 for powering the various components. Power system 1162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 130 may also include one or more optical sensors 1164. FIG. 11 shows an optical sensor coupled to optical sensor controller 1159 in I/O subsystem 1106. Optical sensor 1164 may include charge-coupled device (CCD) or complementary metal-oxide semiconductor (CMOS) phototransistors. Optical sensor 1164 receives light from the environment, projected through one or more lens, and converts the light to data representing an image. In conjunction with imaging module 1143 (also called a camera module) optical sensor 1164 may capture still images or video. In some embodiments, an optical sensor is located on the back of device 130, opposite touch screen display 1112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 130 may also include one or more proximity sensors 1166. FIG. 11 shows proximity sensor 1166 coupled to peripherals interface 1118. Alternately, proximity sensor 1166 may be coupled to input controller 1160 in I/O subsystem 1106. In some embodiments, the proximity sensor turns off and disables touch screen 1112 when the multifunction device is placed near the user's ear (e.g., when the user is making a phone call).

Device 100 includes one or more orientation sensors 1168. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 130. In some embodiments, the one or more orientation sensors include any combination of orientation/rotation sensors. FIG. 11 shows the one or more orientation sensors 1168 coupled to peripherals interface 1118. Alternately, the one or more orientation sensors 1168 may be coupled to an input controller 1160 in I/O subsystem 1106. In some embodiments, information is displayed on the touch screen display in a portrait view or a landscape view based on an analysis of data received from the one or more orientation sensors.

In some embodiments, the software components stored in memory 1102 include operating system 1126, communication module (or set of instructions) 1128, contact/motion module (or set of instructions) 1130, graphics module (or set of instructions) 1132, text input module (or set of instructions) 1134, Global Positioning System (GPS) module (or set of instructions) 1135, screen power management module 1158 and applications (or sets of instructions) 1136. Device/global internal state 1157 includes one or more of: active application state, indicating which applications, if any, are currently active; display state, indicating what applications, views or other information occupy various regions of touch screen display 1112; sensor state, including information obtained from the device's various sensors and input control devices 1116; state information that indicates which processes control output of shared audio or visual resource of a vehicle; ownership transition conditions of the shared audio or visual resource; and location information concerning the device's location and/or attitude.

Operating system 1126 (e.g., Darwin, LINUX, UNIX, OS X, WINDOWS, or an embedded operating system such as VxWorks or RTXC) includes various software components and/or drivers for controlling and managing general system tasks (e.g., memory management, storage device control, power management, etc.) and facilitates communication between various hardware and software components.

Communication module 1128 facilitates communication with other devices over one or more external ports 1124 and also includes various software components for handling data received by RF circuitry 1108 and/or external port 1124. External port 1124 (e.g., Universal Serial Bus (USB), FIREWIRE, etc.) is adapted for coupling directly to other devices or indirectly over a network (e.g., the Internet, wireless LAN, etc.).

Contact/motion module 1130 may detect contact with touch screen 1112 (in conjunction with display controller 1156) and other touch sensitive devices (e.g., a touchpad or physical click wheel). Contact/motion module 1130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 1130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 1130 and display controller 1156 detect contact on a touchpad.

Contact/motion module 1130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 1132 includes various known software components for rendering and displaying graphics on touch screen 1112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 1132 stores data representing graphics to be used. Each graphic may be assigned a corresponding code. Graphics module 1132 receives, from applications etc., one or more codes specifying graphics to be displayed along with, if necessary, coordinate data and other graphic property data, and then generates screen image data to output to display controller 1156.

Text input module 1134, which may be a component of graphics module 1132, provides soft keyboards for entering text in various applications (e.g., contacts 1137, e-mail 1140, IM 1141, browser 1147, and any other application that needs text input).

GPS module 1135 determines the location of the device and provides this information for use in various applications (e.g., to telephone 1138 for use in location-based dialing, to camera 1143 as picture/video metadata, and to applications that provide location-based services such as weather widgets, local yellow page widgets, and map/navigation widgets).

Applications 1136 may include the following modules (or sets of instructions), or a subset or superset thereof:
  contacts module 1137 (sometimes called an address book or contact list);
  telephone module 1138;
  video conferencing module 1139;
  e-mail client module 1140;
  instant messaging (IM) module 1141;
  workout support module 1142;
  camera module 1143 for still and/or video images;
  image management module 1144;
  browser module 1147;
  calendar module 1148;
  widget modules 1149, which may include one or more of: weather widget 1149-1, stocks widget 1149-2, calculator widget 1149-3, alarm clock widget 1149-4, dictionary widget 1149-5, and other widgets obtained by the user, as well as user-created widgets 1149-6;

widget creator module 1150 for making user-created widgets 1149-6;

search module 1151;

video and music player module 1152, which may be made up of a video module and a music module;

notes module 1153;

map module 1154; and/or online video module 1155.

Examples of other applications 1136 that may be stored in memory 1102 include other word processing applications, other image editing applications, drawing applications, presentation applications, JAVA-enabled applications, encryption, digital rights management, voice recognition, and voice replication.

In conjunction with touch screen 1112, display controller 1156, contact module 1130, graphics module 1132, and text input module 1134, contacts module 1137 may be used to manage an address book or contact list (e.g., stored in application internal state 1192 of contacts module 1137 in memory 1102), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 1138, video conference 1139, e-mail 1140, or IM 1141; and so forth.

In conjunction with RF circuitry 1108, audio circuitry 1110, speaker 1111, microphone 1113, touch screen 1112, display controller 1156, contact module 1130, graphics module 1132, and text input module 1134, telephone module 1138 may be used to enter a sequence of characters corresponding to a telephone number, access one or more telephone numbers in address book 1137, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 1108, audio circuitry 1110, speaker 1111, microphone 1113, touch screen 1112, display controller 1156, and communication module 1128, screen power management module 1158 controls portions of a screen active for display use as described herein, by controlling or causing the graphics module 1132 to display first information in an available display area comprising a first portion of a display screen in a configuration having a plurality of portions, responsive to a user indication in the in the first portion, add the second portion to the available display area by transitioning the second portion to the powered-on state to perform display functions and receive user input, and display second information in the second portion, as described herein In conjunction with RF circuitry 1108, audio circuitry 1110, speaker 1111, microphone 1113, touch screen 1112, display controller 1156, optical sensor 1164, screen power management module 1158, contact module 1130, graphics module 1132, text input module 1134, contact list 1137, and telephone module 1138, videoconferencing module 1139 includes executable instructions to initiate, conduct, and terminate a video conference between a user and one or more other participants in accordance with user instructions.

In conjunction with RF circuitry 1108, touch screen 1112, display controller 1156, contact module 1130, graphics module 1132, and text input module 1134, e-mail client module 1140 includes executable instructions to create, send, receive, and manage e-mail in response to user instructions. In conjunction with image management module 1144, e-mail client module 1140 makes it very easy to create and send e-mails with still or video images taken with camera module 1143.

In conjunction with RF circuitry 1108, touch screen 1112, display controller 1156, contact module 1130, graphics module 1132, and text input module 1134, the instant messaging module 1141 includes executable instructions to enter a sequence of characters corresponding to an instant message, to modify previously entered characters, to transmit a respective instant message (for example, using a Short Message Service (SMS) or Multimedia Message Service (MIMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 1108, touch screen 1112, display controller 1156, contact module 1130, graphics module 1132, text input module 1134, GPS module 1135, map module 1154, and music player module 1146, workout support module 1142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 1112, display controller 1156, optical sensor(s) 1164, optical sensor controller 1159, contact module 1130, graphics module 1132, and image management module 1144, camera module 1143 includes executable instructions to capture still images or video (including a video stream) and store them into memory 1102, modify characteristics of a still image or video, or delete a still image or video from memory 1102.

In conjunction with touch screen 1112, display controller 1156, contact module 1130, graphics module 1132, text input module 1134, and camera module 1143, image management module 1144 includes executable instructions to arrange, modify (e.g., edit), or otherwise manipulate, label, delete, present (e.g., in a digital slide show or album), and store still and/or video images.

In conjunction with RF circuitry 1108, touch screen 1112, display system controller 1156, contact module 1130, graphics module 1132, and text input module 1134, browser module 1147 includes executable instructions to browse the Internet in accordance with user instructions, including searching, linking to, receiving, and displaying web pages or portions thereof, as well as attachments and other files linked to web pages.

In conjunction with RF circuitry 1108, touch screen 1112, display system controller 1156, contact module 1130, graphics module 1132, text input module 1134, e-mail client module 1140, and browser module 1147, calendar module 1148 includes executable instructions to create, display, modify, and store calendars and data associated with calendars (e.g., calendar entries, to do lists, etc.) in accordance with user instructions.

In conjunction with RF circuitry 1108, touch screen 1112, display system controller 1156, contact module 1130, graphics module 1132, text input module 1134, and browser module 1147, widget modules 1149 are mini-applications that may be downloaded and used by a user (e.g., weather widget 1149-1, stocks widget 1149-2, calculator widget 1149-3, alarm clock widget 1149-4, and dictionary widget 1149-5) or created by the user (e.g., user-created widget 1149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 1108, touch screen 1112, display system controller 1156, contact module 1130, graphics module 1132, text input module 1134, and browser module 1147, the widget creator module 1150 may be used by a user to create widgets (e.g., turning a user-specified portion of a web page into a widget).

In conjunction with touch screen 1112, display system controller 1156, contact module 1130, graphics module 1132, and text input module 1134, search module 1151 includes executable instructions to search for text, music, sound, image, video, and/or other files in memory 1102 that match one or more search criteria (e.g., one or more user-specified search terms) in accordance with user instructions.

In conjunction with touch screen 1112, display system controller 1156, contact module 1130, graphics module 1132, audio circuitry 1110, speaker 1111, RF circuitry 1108, and browser module 1147, video and music player module 1152 includes executable instructions that allow the user to download and play back recorded music and other sound files stored in one or more file formats, such as MP3 or AAC files, and executable instructions to display, present or otherwise play back videos (e.g., on touch screen 1112 or on an external, connected display via external port 1124). In some embodiments, device 130 may include the functionality of an MP3 player.

In conjunction with touch screen 1112, display controller 1156, contact module 1130, graphics module 1132, and text input module 1134, notes module 1153 includes executable instructions to create and manage notes, to do lists, and the like in accordance with user instructions.

In conjunction with RF circuitry 1108, touch screen 1112, display system controller 1156, contact module 1130, graphics module 1132, text input module 1134, GPS module 1135, and browser module 1147, map module 1154 may be used to receive, display, modify, and store maps and data associated with maps (e.g., driving directions; data on stores and other points of interest at or near a particular location; and other location-based data) in accordance with user instructions.

In conjunction with touch screen 1112, display system controller 1156, contact module 1130, graphics module 1132, audio circuitry 1110, speaker 1111, RF circuitry 1108, text input module 1134, e-mail client module 1140, and browser module 1147, online video module 1155 includes instructions that allow the user to access, browse, receive (e.g., by streaming and/or download), play back (e.g., on the touch screen or on an external, connected display via external port 1124), send an e-mail with a link to a particular online video, and otherwise manage online videos in one or more file formats, such as H.264. In some embodiments, instant messaging module 1141, rather than e-mail client module 1140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, memory 1102 may store a subset of the modules and data structures identified above. Furthermore, memory 1102 may store additional modules and data structures not described above.

In some embodiments, device 130 is a device where operation of a predefined set of functions on the device is performed exclusively through a touch screen and/or a touchpad. By using a touch screen and/or a touchpad as the primary input control device for operation of device 130, the number of physical input control devices (such as push buttons, dials, and the like) on device 130 may be reduced.

The predefined set of functions that may be performed exclusively through a touch screen and/or a touchpad include navigation between user interfaces. In some embodiments, the touchpad, when touched by the user, navigates device 130 to a main, home, or root menu from any user interface that may be displayed on device 130. In such embodiments, the touchpad may be referred to as a "menu button." In some other embodiments, the menu button may be a physical push button or other physical input control device instead of a touchpad.

While a portable or mobile computing device is shown as one embodiment of a multifunction device, one of skill in the art will readily realize in light of having read the current disclosure that a desktop computer or other computing device may also perform many of the functions described herein without departing from the scope and intent of the present disclosure. Likewise, while touch screen devices are shown as one embodiment of a multifunction device, one of skill in the art will readily realize in light of having read the current disclosure that a desktop computer or other computing device without a touch screen may also perform many of the functions described herein without departing from the scope and intent of the present disclosure.

Figure 12:
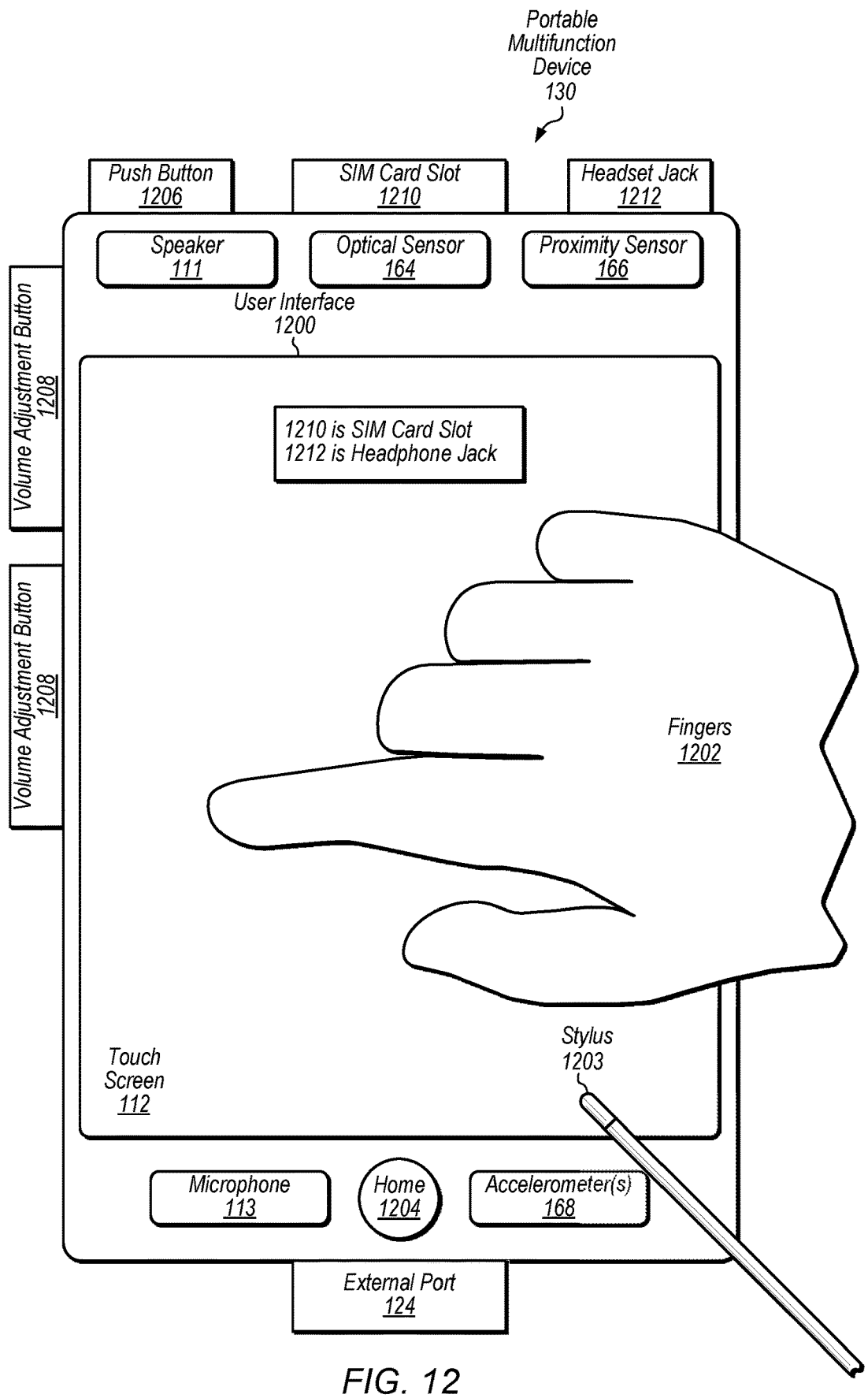
FIG. 12 illustrates a block diagram of a portable multifunction device, in some embodiments.

FIG. 12 illustrates a portable multifunction device 130 in accordance with some embodiments. The touch screen may display one or more graphics within user interface (UI) 1200. In this embodiment, as well as others described below, a user may select one or more of the graphics by making a gesture on the graphics, for example, with one or more fingers 1202 (not drawn to scale in the figure) or one or more styluses 1203 (not drawn to scale in the figure).

Device 130 may also include one or more physical buttons, such as "home" or menu button 1204. As described previously, menu button 1204 may be used to navigate to any application 1136 in a set of applications that may be executed on device 130. Alternatively, in some embodiments, the menu button is implemented as a soft key in a GUI displayed on touch screen 1112.

In one embodiment, device 130 includes touch screen 1112, menu button 1204, push button 1206 for powering the device on/off and locking the device, volume adjustment button(s) 1208, Subscriber Identity Module (SIM) card slot 1210, head set jack 1212, and docking/charging external port 1124. Push button 1206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process.

In an alternative embodiment, device 130 (as well as portable device repair machine 110) also may accept verbal input for activation or deactivation of some functions through a microphone (e.g., 113 of device 130).

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

The various methods as depicted in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the enterprise system, product database, and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some or all of the elements in the list.

The use of the terms "a," "an," "the," and similar references in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not imply that certain embodiments require at least one of X, at least one of Y, and/or at least one of Z in order for each to be present.

Variations of those embodiments may become apparent to those skilled in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A portable device repair machine comprising:
a receptacle configured to receive a portable multifunction device;
one or more automated mechanisms configured to:
secure the portable multifunction device when the portable multifunction device is received by the receptacle, establish an electronic connection with the portable multifunction device, and identify and diagnose a malfunction resulting from a damage or a degradation of at least one component of the portable multifunction device; and a display configured to:
display one or more selectable suggested remedies for the at least one component of the portable multifunction device based on the diagnosis;
receive a selection of at least one of the one or more selectable suggested remedies for the at least one component of the portable multifunction device, and respond to the selection of at least one of the one or more selectable suggested remedies,
wherein the one or more automated mechanisms comprise one or more computers comprising a memory, the memory storing one or more executable program instructions that, when executed by one or more computers, cause the one or more computers to implement one or more control modules configured to:
transmit an instruction to the one or more automated mechanisms to convey the portable multifunction device to a physical upgrade mechanism of the portable device repair machine;
direct one or more robotic arms to disassemble the portable multifunction device;
direct the one or more robotic arms to reassemble the portable multifunction device while incorporating a physical upgrade to the at least one component of the portable multifunction device of the portable multifunction device; and
transmit an instruction to the receptacle to convey the portable multifunction device from the portable device repair machine.

2. The portable device repair machine of claim 1, wherein to establish the electronic connection with the portable multifunction device, the one or more automated mechanisms are further configured to physically connect a network connection to the portable multifunction device via mechanized process.

3. The portable device repair machine of claim 1, wherein the one or more automated mechanisms comprise a physical inspection mechanism configured to obtain digital images of the portable multifunction device, and wherein the portable device repair machine further comprises memory storing executable program instructions that are executed to implement a physical inspection module configured to:
receive the digital images of the portable multifunction device; analyze the digital images of the portable multifunction device; determine, based on the analysis of the digital images, one or more characteristics of the portable multifunction device.

4. The portable device repair machine of claim 1, wherein the upgrade to the at least one component of portable multifunction device comprises a battery upgrade or a memory upgrade, and wherein to perform the upgrade to the at least one component of the portable multifunction device, the physical upgrade mechanism comprises physical mechanisms configured to:
access a physical battery or a memory of the portable multifunction device; remove the existing battery or the memory from the portable multifunction device;
and install a new battery or a new memory from operation with the portable multifunction device.

5. A method implemented by one or more computers of a portable device repair machine, the method comprising:
directing, by the one or more computers, an image sensor to obtain one or more images of a portable multifunction device;
determining, by the one or more computers a process for physically attaching a network connection to the portable multifunction device based on the one or more images; instructing, by the one or more computers, a network connection mechanism to physically attach the network connection to the portable multifunction device;
establishing, by the one or more computers, an electronic connection between the portable device repair machine and the portable multifunction device via the network connection;
identifying and diagnosing, by the computing device via the electronic connection, a malfunction resulting from a damage to or a degradation of at least one component of the portable multifunction device;
transmitting, by the one or more computers, an instruction to an automated mechanism to convey the portable multifunction device to a physical upgrade mechanism of the portable device repair machine;
directing, by the one or more computers, one or more robotic arms to disassemble the portable multifunction device;
directing, by the one or more computers, the one or more robotic arms to reassemble the portable multifunction device while incorporating a physical upgrade to the at least one component of the portable multifunction device of the portable multifunction device; and
transmitting, by the one or more computers, an instruction to a receptacle to convey the portable multifunction device from the portable device repair machine.

6. The method of claim 5, further comprising prior to the one or more computers directing the image sensor to obtain one or more images of the portable multifunction device:
transmitting, by the one or more computers, an instruction to a user interface to display a request for a deposit of the portable multifunction device into a receptacle of the portable device repair machine.

7. The method of claim 5, wherein determining, by the one or more computers, the process for physically attaching the network connection to the portable multifunction device includes:
determining, by the one or more computers, one or more candidate model numbers for the portable multifunction device based on the one or more images of the portable multifunction device, transmitting, by the one or more computers, an instruction to a user interface to display a request for a selection of a model number of the one or more candidate model numbers, wherein the model number is associated with the portable multifunction device; and receiving, by the one or more computers and from a data store, the process for physically attaching the network connection to the portable multifunction device.

8. The method of claim 5, further comprising:
receiving, by the one or more computers, an indication, from the user interface, of a selection of at least one of the one or more selectable remedies.

9. The method of claim 5, further comprising:
analyzing, by the one or more computers, the one or more images of the portable multifunction device; and determining, by the one or more computers, one or more characteristics of the portable multifunction device based on the analysis of the one or more images; wherein determining, by the one or more computers, the process for physically attaching the network connection to the portable multifunction device is based on the one or more characteristics of the portable multifunction device.

10. The method of claim 9, wherein the one or more characteristics include a manufacturer, a model number, or a type of cable connector interface of the portable multifunction device.

11. The method of claim 5, further comprising:
transmitting, by the one or more computers, an instruction to a user interface to display a request for payment; and receiving, by the one or more computers, an indication that a payment has been collected before diagnosing the portable multifunction device.

12. A non-transitory, computer-readable storage medium storing one or more executable program instructions that, when executed by one or more computers, cause the one or more computers to implement one or more control modules configured to:
obtain one or more images of a portable multifunction device; determine, based on the one or more images, a process for physically attaching a network connection to the portable multifunction device; instruct a network connection mechanism of a portable device repair machine to physically attach the network connection to the portable multifunction device;
establish an electronic connection between the portable device repair machine and the portable multifunction device via the network connection; identify and diagnose a malfunction resulting from a damage to or a degradation of at least one component of the portable multifunction device via the network connection;
transmit an instruction to an automated mechanism to convey the portable multifunction device to a physical upgrade mechanism of the portable device repair machine;
direct one or more robotic arms to disassemble the portable multifunction device;
direct the one or more robotic arms to reassemble the portable multifunction device while incorporating a physical upgrade to the at least one component of the portable multifunction device of the portable multifunction device; and
transmit an instruction to a receptacle to convey the portable multifunction device from the portable device repair machine.

13. The non-transitory, computer-readable storage medium of claim 12, wherein the one or more control modules are further configured to:
instruct a conveyance mechanism to convey the portable multifunction device to the network connection mechanism to physically attach the network connection to the portable multifunction device.

14. The non-transitory, computer-readable storage medium of claim 12, wherein the one or more control modules are further configured to: identify, based on the one or more images, a network connection type that is compatible with the portable multifunction device; and select the network connection based on the network connection type.

15. The non-transitory, computer-readable storage medium of claim 12, wherein the one or more control modules are further configured to:
direct one or more robotic arms, based on image analysis of the connection process, to attach the network connector to the portable multifunction device.

16. The non-transitory, computer-readable storage medium of claim 12, wherein the one or more control modules are further configured to:
direct one or more robotic arms, based on image analysis of the establishment of the electronic connection, to power the portable multifunction device on.

17. The non-transitory, computer-readable storage medium of claim 12, wherein the one or more control modules are further configured to:
direct one or more robotic arms, based on image analysis of the diagnosis of the portable multifunction device, to navigate a menu system of the portable multifunction device and place the portable multifunction device in a diagnostic mode.

18. The non-transitory, computer-readable storage medium of claim 12, wherein the one or more control modules are further configured to provide on-line and real-time interactive voice and video communication via a user interface.

* * * * *